United States Patent
Tsoukalas et al.

(10) Patent No.: US 6,955,256 B2
(45) Date of Patent: Oct. 18, 2005

(54) CONVEYOR (75) Inventors: George Tsoukalas, Dulwich Hill (AU); Alfred A. Taylor, Lugarno (AU)

(73) Assignee: TNA Australia PTY Limited, Lidcombe (AU)

( * ) Notice: Subject to any disclaimer, the term of this patent is extended or adjusted under 35 U.S.C. 154(b) by 18 days.

(21) Appl. No.: 10/386,909

(22) Filed: Mar. 11, 2003

(65) Prior Publication Data

US 2004/0035189 A1 Feb. 26, 2004

(30) Foreign Application Priority Data

Mar. 12, 2002 (AU) .............................................. PS1052

(51) Int. Cl.$^7$ ................................................ B65G 15/12
(52) U.S. Cl. ................. 198/626.5; 198/620; 198/626.4; 73/49.3; 73/649
(58) Field of Search ............................. 198/620, 626.2, 198/626.3, 626.4, 626.5, 626.6; 73/41, 49.2, 49.3, 52, 649, 664

(56) References Cited

U.S. PATENT DOCUMENTS

| 4,024,956 A | 5/1977 | Cassidy |
| 4,649,740 A | 3/1987 | Franklin |
| 4,671,101 A | 6/1987 | Franklin |
| 4,697,452 A | 10/1987 | Prakken |
| 4,901,574 A | 2/1990 | Fitzpatrick |
| 5,251,422 A | 10/1993 | Goodman et al. |
| 5,279,099 A | 1/1994 | Goodman et al. |
| 5,284,003 A | 2/1994 | Goodman et al. |
| 5,305,868 A | * 4/1994 | Grathoff .................. 198/626.4 |
| 5,531,101 A | 7/1996 | Fenlon |
| 5,542,288 A | 8/1996 | Fenlon |
| 5,786,530 A | 7/1998 | Fenlon |
| 5,875,697 A | * 3/1999 | Cole et al. ............... 198/626.4 |
| 5,966,901 A | * 10/1999 | Komp et al. ............. 198/626.3 |
| 6,041,646 A | 3/2000 | Fenlon |
| 6,094,888 A | 8/2000 | Pazdernik et al. |
| 6,105,419 A | 8/2000 | Michels et al. |
| 6,202,476 B1 | 3/2001 | Fenlon |
| 2002/0029617 A1 | 3/2002 | Taylor |

FOREIGN PATENT DOCUMENTS

| GB | 2 036 681 A | 7/1980 |
| GB | 2234076 A | 1/1991 |
| JP | 09226929 A | 9/1997 |
| JP | 2000219218 A | 8/2000 |
| JP | 2000219219 A | 8/2000 |
| JP | 2000219220 A | 8/2000 |
| WO | WO 93/07459 A1 | 4/1993 |
| WO | WO 97/18453 A1 | 5/1997 |

* cited by examiner

Primary Examiner—James R. Bidwell
(74) Attorney, Agent, or Firm—Townsend and Townsend and Crew LLP (57) ABSTRACT A conveyor assembly 18 that detects bags that leak. The assembly 18 includes a first conveyor 24 that operates in unison with a second conveyor 29. The conveyors 24 and 29 confine the bags in chambers, with the bags being engaged by pressure assemblies 50 so that the bags that leak are reduced in volume. The bags are engaged at a downstream position and at an upstream position by detection devices 44 that provide a signal indicative of the volume of each bag. These signals are compared to thereby identify bags that leak.

22 Claims, 6 Drawing Sheets

CONVEYOR

TECHNICAL FIELD

The present invention relates to conveyors and more particularly, but not exclusively, to conveyors employed in the packaging industry.

BACKGROUND OF THE INVENTION

There are many instances in the packaging industry, particularly the packaging industry associated with snack foods, for bags to be delivered from a packaging machine to a predetermined location in a selected orientation. Traditionally, bags emanating from a packaging machine generally fall to a conveyor and arrive at the predetermined location in an unpredictable orientation.

There is also known apparatus to test bags for leaks. For example, leaks may occur in bags where product inadvertently becomes located between the sealing jaws of a packaging machine and therefore located in the seals at the ends of the bag. Known apparatus to test bags for leaks includes reciprocally mounted plates which engage the bag to apply pressure thereto. Any reduction in the volume of the bag indicates a leak. Accordingly, the apparatus includes a sensing mechanism to detect movement of the plate and therefore a reduction in volume of the bag. Known apparatus also include a plurality of fingers which engage the bag to determine the profile thereof. Again, pressure is applied to the bag and the profile again determined. Any reduction in the volume of the bag indicates a leak. Such known apparatus are described in U.S. Pat. Nos. 6,202,476 and 6,041,646. These known leak detecting apparatus although reliable are known to fail to detect some leaks.

OBJECT OF THE INVENTION

It is an object of the present invention to provide a conveyor which maintains the orientation of articles being conveyed thereby, and more particularly but not exclusively to overcome or substantially ameliorate the above disadvantage of known apparatus to detect leaks in bags.

SUMMARY OF THE INVENTION

There is disclosed herein a conveyor assembly to move items along a predetermined path, the conveyor assembly including:

a first conveyor length extending parallel to the path and being provided to substantially rigidly support the items in contact with the first length;

a second conveyor length to be moved in unison with the first conveyor length and being substantially coextensive with respect thereto, and wherein the second conveyor length is substantially inflexible except for deformation about an axis transverse of the path so that the second length can be deformed to accommodate any of the items located between the first and second lengths by deformation of the second length.

Preferably, the assembly includes:

a first conveyor having the first length;

a support for the first length so that the first length substantially rigidly supports the items with the second length being above the first length;

a second conveyor having the second length; and wherein one of the conveyors has a first endless member and a second endless member transversely spaced from the first member.

Preferably, the first and second members comprise the first conveyor, with the conveyor members being generally parallel along the first length with their transverse spacing forming a gap, to provide access to items located between the first and second lengths, and the support has a longitudinal slot adjacent the gap to also provide access to the items.

Preferably the assembly is adapted to convey bags, with the assembly including a detection device to protrude between the first and second members to engage the bags located between the first and second lengths to apply pressure thereto and to determine a change in the volume of the bag to thereby detect bags with leaks.

In a further preferred form, the assembly is adapted to convey bags, with the assembly further including a detection device to engage the second length to apply pressure to bags located between the first and second lengths and to detect a change in volume of the bags to thereby detect bags that leak.

In a further preferred form, the assembly includes first and second belts, the first and second belts being positioned on opposite sides of the first length to engage the first length so as to maintain the first length stationary with respect to the second length.

There is further disclosed herein a combination to detect leaks in bags, the combination including:

a conveyor assembly that receives the bags so that the bags are located at spaced locations along the conveyor assembly, the conveyor assembly providing two conveyor lengths that are coextensive and between which the bags are located so that each bag is located in a chamber defined between the lengths, each chamber having a configuration, and a retaining assembly associated with a first one of the lengths so as to maintain the configuration of the chambers provided by the lengths;

a pressure assembly to engage the bags within the chambers to apply pressure thereto so that bags that leak are reduced in volume;

a detector located downstream of the pressure assembly to engage each bag in its respective chamber and to provide a signal indicative of the volume of each bag engaged; and a detector upstream of the pressure assembly to engage each bag in its respective chamber and to generate a signal indicative of the volume thereof so that bags that leak can be detected by comparing the signals generated by the detectors with respect to each bag.

Preferably in the above combination the first length is provided by a first conveyor and the second length is provided by a second conveyor, with one of the conveyors including coextensive transversely spaced first and second endless members, and each detector including a projection tat projects between the endless members to engage the bags, and the pressure assembly including at least one projection that projects between the endless members also to engage the bags to apply pressure thereto.

There is still further disclosed herein a combination to detect leaks in bags, the combination including:

a conveyor assembly that receives the bags so that the bags are located at spaced locations along the conveyor assembly, the assembly having opposing surfaces between which the bags are located so that the bags are confined; and a detector device that engages each bag at a downstream location and an upstream location so as to generate signals indicative of the volume of each bag at each location; and a pressure device to apply pressure to the bags as they pass between the upstream and downstream occasions so that bags that leak will have a reduced volume by the time they reach the upstream location so that the signals generated with respect to each bag can be compared to thereby identify bags that have been reduced in volume as a result of the pressure being applied thereto.

There is still further included herein a method of detecting bags that leak, the method including the steps of:

locating a plurality of bags, each having a volume, on a conveyor assembly that substantially encloses the bags each in a respective chamber, each chamber having a configuration that is maintained over a length of the conveyor assembly, engaging each bag at a downstream location of the length with a detector that generates a signal indicative of the volume of the bag engaged;

applying pressure to the bags upstream of the downstream detector; and engaging each bag at an upstream location, after pressure has been applied to the bags, with a detector that generates a signal indicative of the volume of each bag engaged so that the signals generated with respect to each bag can be compared to identify the bags that have been reduced in volume as result of the pressure being applied thereto.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
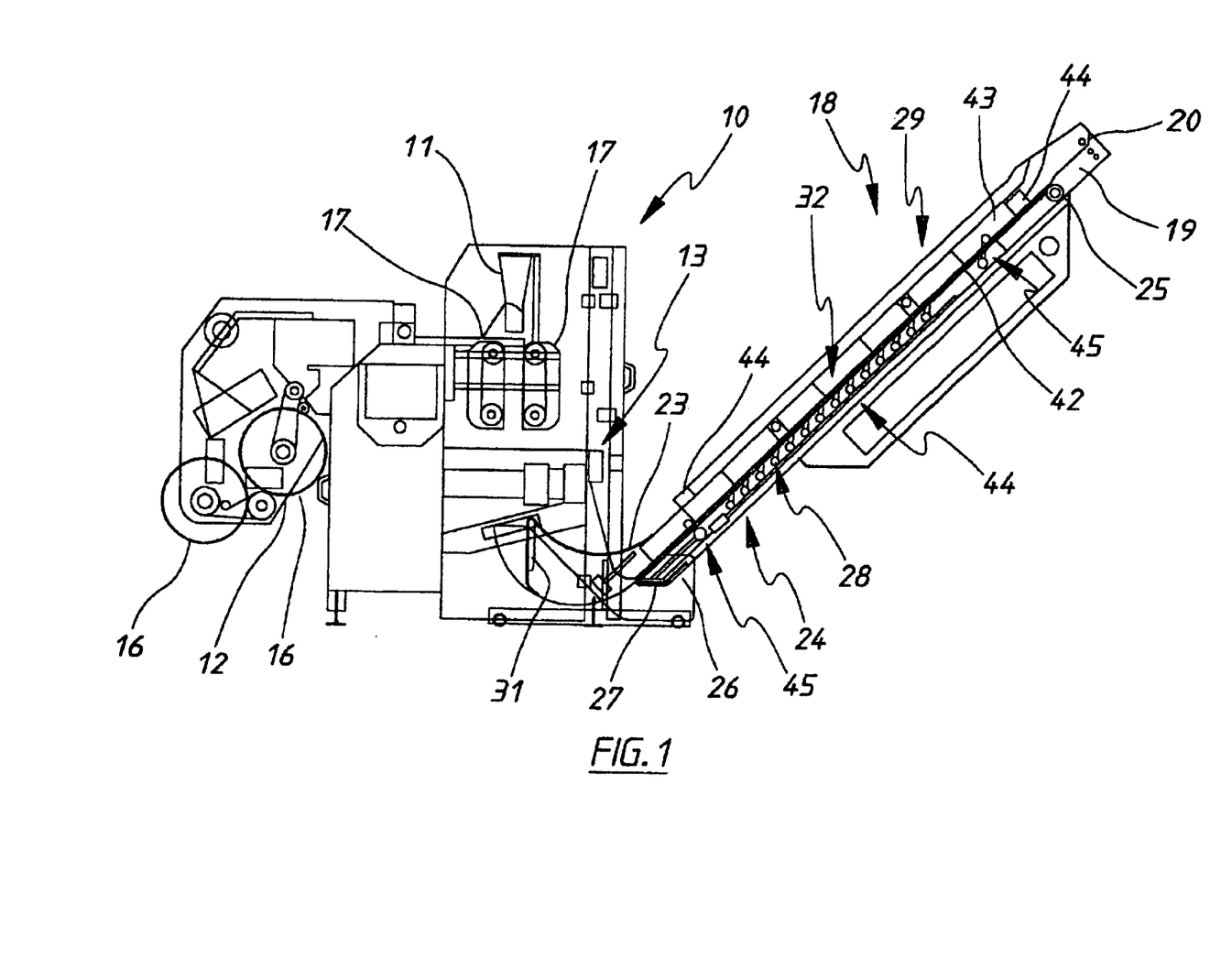
FIG. 1 is a schematic side elevation of a packaging machine and conveyor assembly associated therewith.
Figure 2:
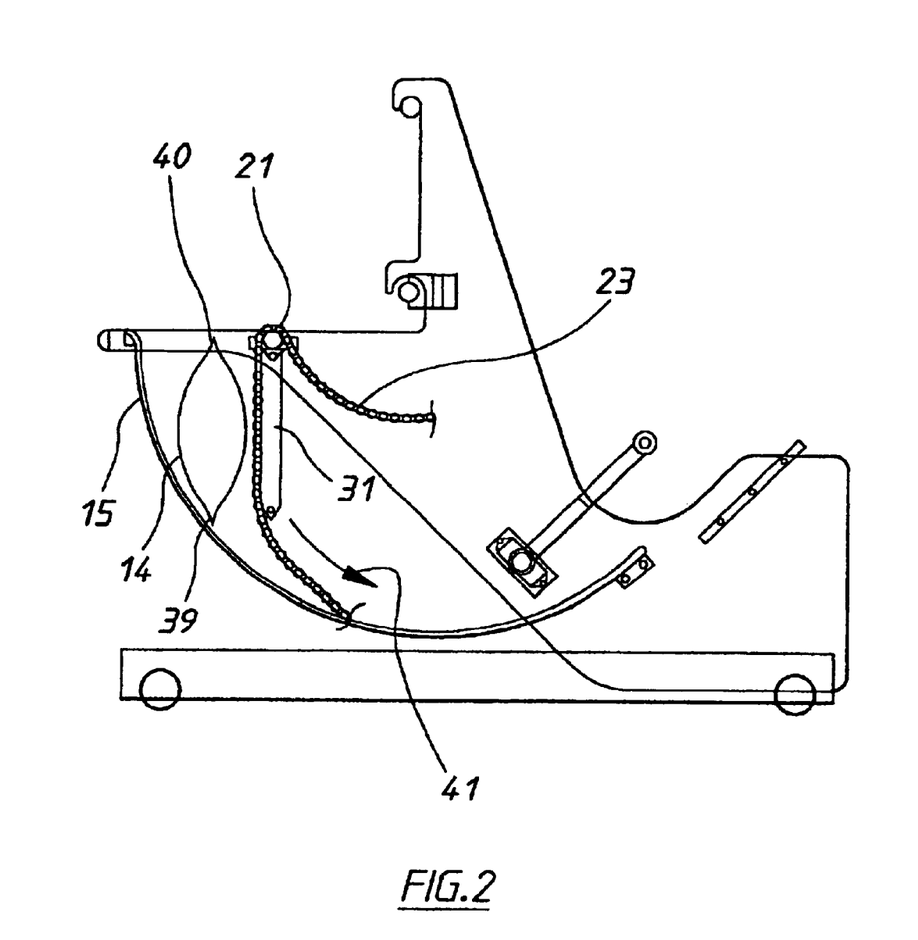
FIG. 2 is a schematic side elevation of a portion of the conveyor of FIG. 1.

In the accompanying drawings, there is schematically depicted a packaging machine 10 that receives batches of product through a former 11. The former 11 also receives a strip of bag material 12 and forms the bag material 12 into a tubular configuration that is to pass through the machine 10. The machine 10 has a rotary jaw assembly 13 that transversely seals and transversely cuts the tubular bag material to form discreet bags 14. The bags 14 fall from the jaw assembly 13 to a chute 15. The tubular bag material is pulled past the former 11 and from the rolls 16 by driven belts 17. For example, the machine 13 could be the packaging machine described in U.S. Pat. No. 4,663,917.

The chute 15 is part of a conveyor assembly 18. The assembly 18 has a longitudinally extending frame 19. Associated with the frame 19 is a first conveyor 24 that includes a driven sprocket 25 driving an endless conveyor member or belt 26. The lower end of the belt 26 passes a guide member 27. The first conveyor 24 provides a first conveyor length 28.

Associated with and above the first conveyor 24 is a second conveyor 29. The second conveyor 29 includes a driven sprocket 20 and an endless conveyor member or belt 23. The belt 23 passes a second sprocket 21 and a vertically extending guide surface 31 within the chute 15. The belt 23 provides a second conveyor length 32 that is substantially parallel and coextensive with respect to the first conveyor length 28.

Figures 10, 12:
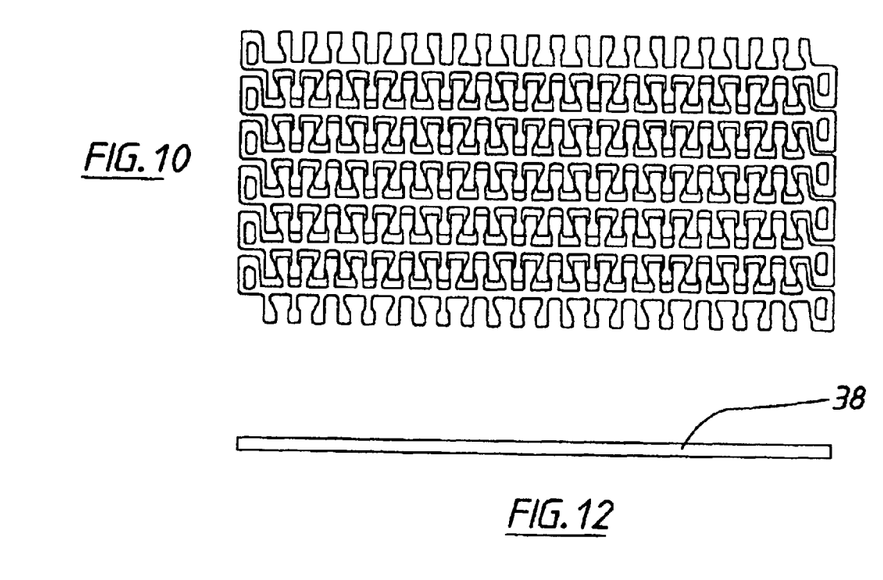
FIG. 10 is a schematic top plan view of a portion of a conveyor employed in FIG. 1.
FIG. 12 is a schematic end elevation of a pin employed in the conveyor portion of FIG. 10.
Figure 13:
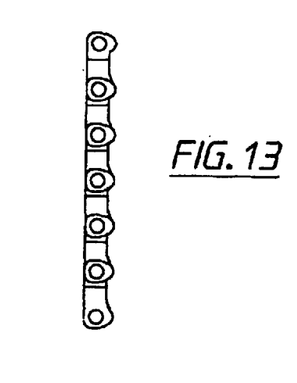
FIG. 13 is a schematic end elevation of a conveyor portion of FIG. 10.

Each belt 23 and 26 is formed from a plurality of links 33 that are preferably molded from plastics material. The links 33 include a plurality of first projections 34 each provided with an aperture 35. Each link 33 further has a second series of projections 35, with the projections 35 each having an aperture 37. A series of links 33 are arranged as shown in FIG. 10, with the projections 34 located between the projections 36 of the next adjacent link 33. A pin 38 passes through the aligned apertures 35 and 37 so that adjacent links 33 are pivotably attached for relative movement about a longitudinal axis of the respective pin 38. A short segment of each of the belts 23 and 26 is illustrated in FIGS. 10 and 13. Particularly with respect to the belt 23, the link construction ensures that the belt 23 is only flexible about the longitudinal axis of the pin 38, that is, an axis transverse of the belt 23. The construction inhibits defamation of the belt 23 apart from pivoting movement between the links 33 about the pins 38, that is, an axis transverse of the belt 26.

The chute 15 in cooperation with the belt 23 captures each bag 14 as it is delivered from the machine 13 so as to preserve the initial orientation of the bag 14. That is, the bag 14 is retained with the lower bag seal 39 leading and being trailed by the upper bag seal 40. More particularly, the belt 23 by moving in the direction of the arrow 41, converges with respect to the chute 15 so as to securely engage each bag 14 and move the bags 14 in the direction of the arrow 41. Each of the bags 14 moves along the chute 15 until it reaches the belt 26. The belt 26 is also moving in the direction of the arrow 41 and at the same speed as a belt 23. As the first length 28 is generally coextensive with the second length 32, and moving in unison therewith, again the orientation of the bags 14 is retained. When the bags 14 becomes "sandwiched" between the belts 23 and 26, the belt 23 deforms so as to pass over the bags 14 while the belt 26 remains substantially flat due to the supporting surface provided by the longitudinally extending plate 42.

Figures 3, 4:
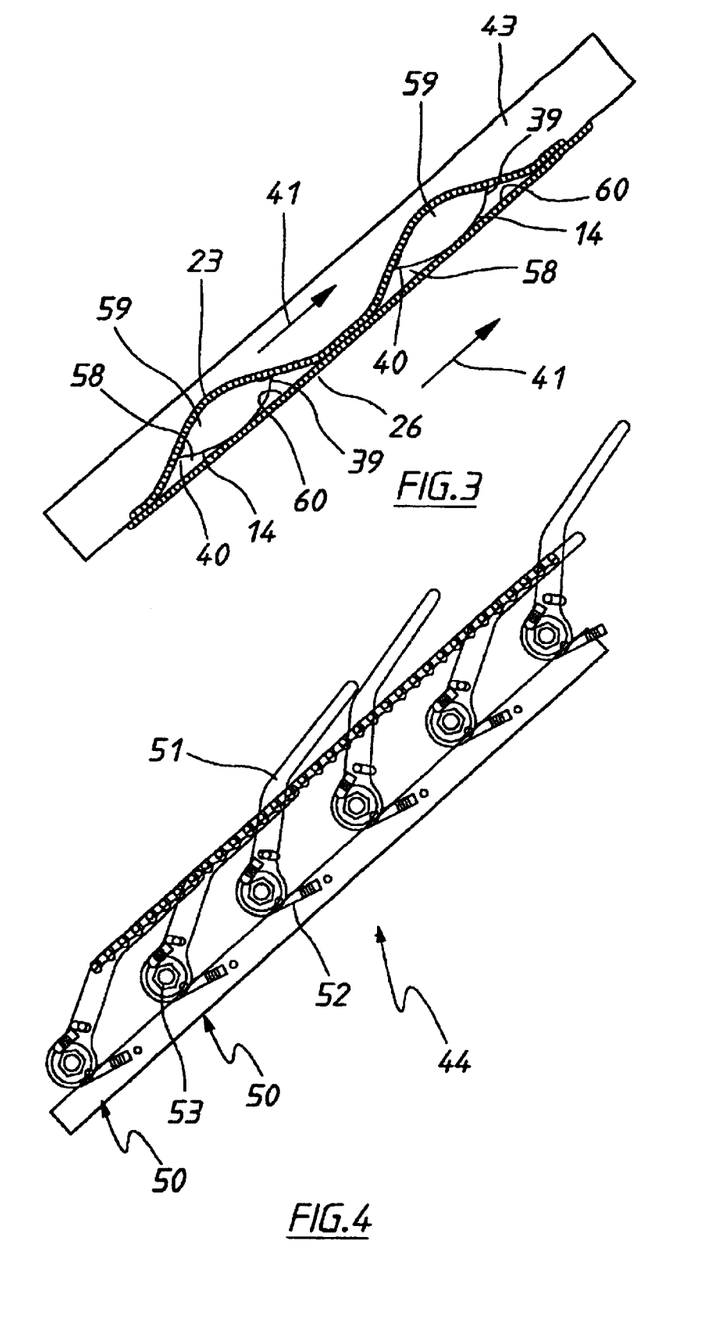
FIG. 3 is a schematic side perspective view of a portion of the conveyor of FIG. 1.
FIG. 4 is a schematic side elevation of a device to engage bags being moved by the conveyor of FIG. 1 to apply pressure to the bags.
Figure 5:
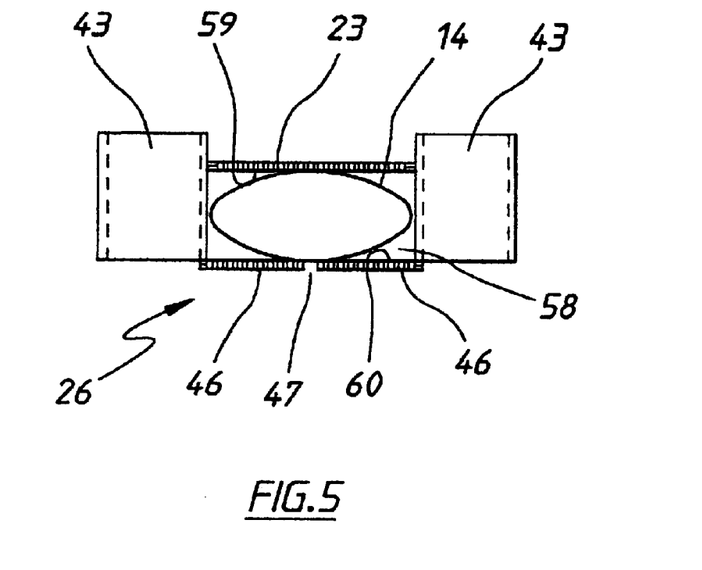
FIG. 5 is a schematic end elevation of the conveyor portion of FIG. 3.

In the embodiment of FIG. 3, there is provided a retaining assembly 57 including, adjacent each longitudinal side of the first conveyor length 28, a retaining belt 43. The retaining assembly 57 engages the length 28 so that the lengths 28 and 29 provide compartments 58 relatively fixed in configuration. The retaining belts 43 have their transverse width extending generally upwardly and pass between pairs of rollers 44, of which at least one is driven. More particularly, the belts 43 engage the belt 26 so as to maintain the configuration of the belt 26 over the first length 28 once the belt 23 has been deformed to accommodate a bag 14. Accordingly, the bags 14 are each confined in a generally rigid compartment 58. Each compartment is defined between opposing conveyor surfaces 59 and 60.

In the embodiment of FIGS. 1 to 7, the plate 42 and belt 26 are longitudinally divided so that the belt 26 has two coextensive endless belt members 46 (providing the first belt length 28), with the belt members 46 spaced by a gap 47. The plate 42 has a longitudinal slot 58 adjacent the gap 47.

Figure 6:
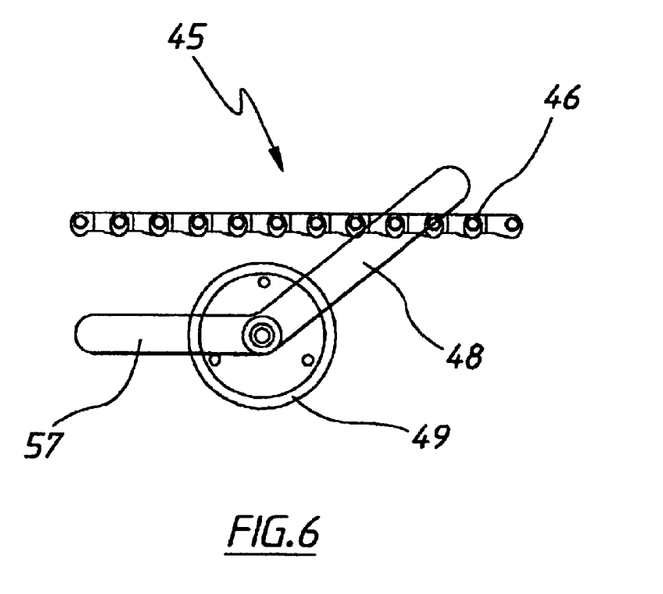
FIG. 6 is a schematic side elevation of a device to aid in detecting bags with leaks.
Figure 7:
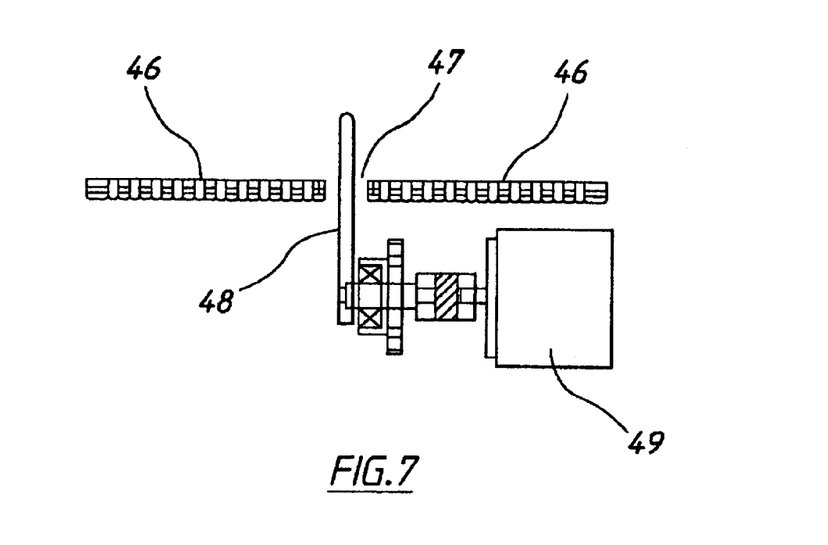
FIG. 7 is a schematic end elevation of the device of FIG. 6.

In this embodiment, there is provided in combination with the conveyor assembly 18 a detection device 44 to detect bags that leak. The device 44 includes a detector 45 as seen in FIG. 6. The detector 45 includes an arm 48 that projects through the gap 47 and slot 58 to engage the bag 14. The detector 45 generates a signal indicative of the volume of the bag 14. More particularly, the arm 48 is attached to a signal generator 49 that generates the above-mentioned signal. The arm 48 is urged into contact with the bags 14 by the arm 57 being weighted.

Located at spaced positions along the length of the first conveyor 24 are pressure assemblies 50. Each of the assemblies 50 includes an arm 51 that is urged by means of a spring 52 into contact with the bags 14 to apply pressure thereto. This pressure will cause at least partial deflation of any bag that leaks. Each of the arms 51 is pivotably mounted by means of a pivot assembly 53 so that the arms 51 can pivot about generally horizontal transverse axes to permit the bags 14 to pass thereby.

Located adjacent the upper end of the conveyor 24 is a further detector 45 comprising an upstream detector that again would generate a signal indicative of the volume of each of the bags 14 passing thereby. This is compared to the signal generated by the lower (downstream) detector 45 with respect to the particular bag 14, thereby enabling the detection of bags 14 that leak. The defective bags 14 can be removed and, if required, the machine 13 stopped and serviced should that be required. The upstream and downstream detectors 45 provide a detector device that provides two signals for each bag.

In the above preferred embodiment with respect to detecting bags that leak, the bags 14 are engaged by each detector 45. That is, each bag 14 is engaged by a single arm 48 so that there is a relatively small contact area with the bags 14. This enhances detection, as any volume reduction will result in a substantial angular deflection of the arm 48 of the upstream detector 45 relative to the arm 48 of the downstream detector 45.

Figure 8:
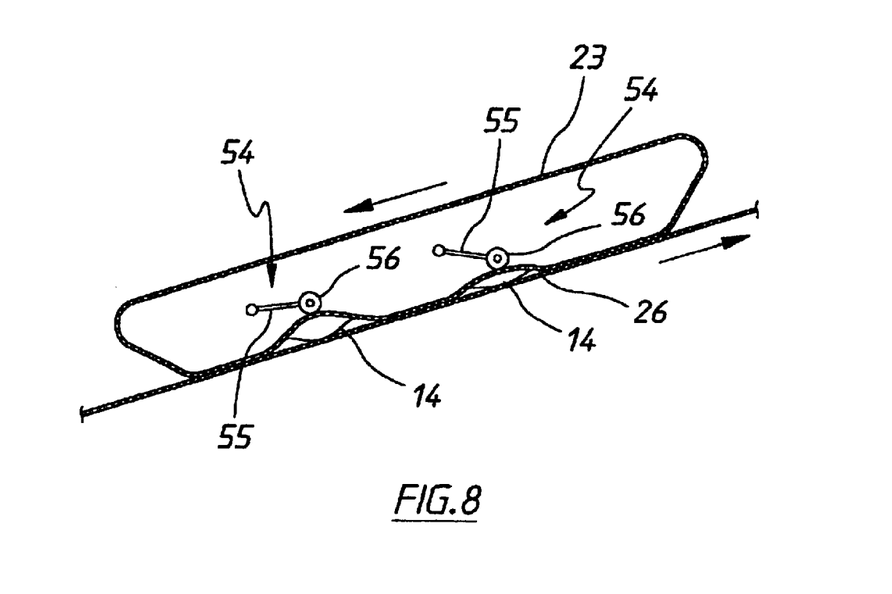
FIG. 8 is a schematic side elevation of a modification of the conveyor of FIG. 1 with a device to aid in detecting bags with leaks.
Figures 9, 11:
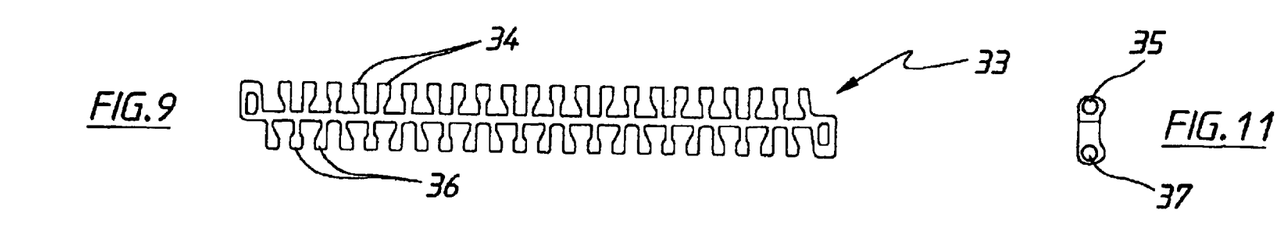
FIG. 9 is a schematic top plan view of a link employed in the conveyor of FIG. 1.
FIG. 11 is a schematic end elevation of the link of FIG. 9.

In an alternative embodiment (as shown in FIG. 8), detectors 54 are employed. Each detector 54 includes a pivoted arm 55 terminating with rollers 56. The rollers 56 are urged into contact with the conveyor 23 to thereby apply pressure to the bags 14. A bag 14 that leaks will therefore reduce in volume as the conveyor 23 deforms under the rollers 56. The detectors 54 include electronic apparatus to produce a signal indicative of the angular displacement of the arms 55. Should the arms 55 have a significant different angular displacement for a specific bag 14, the bag 14 would be considered defective, that is, a bag that leaks. Again the bag would be removed, and the machine 13 serviced if required.

What is claimed is:

1. A conveyor assembly to move items along a predetermined path, said conveyor assembly including:
    a first conveyor length extending parallel to said path and being provided to substantially rigidly support the items in contact with said first length; and
    a second conveyor length to be moved in unison with the first conveyor length and being substantially coextensive with respect thereto, and wherein said second conveyor length is substantially inflexible except for deformation about an axis transverse of said path so that said second length is deformed to form compartments to accommodate any of the items located between the first and second lengths by deformation of the second length.

2. The conveyor of claim 1 wherein said assembly includes:
    a first conveyor having said first length;
    a support for said first length so that the first length substantially rigidly supports the items with said second length being above said first length;
    a second conveyor having said second length; and wherein
    one of the conveyors has a first endless member and a second endless member transversely spaced from the first member.

3. The conveyor of claim 2 wherein the first and second members provide said first conveyor, with the conveyor members being generally parallel along said first length with their transverse spacing forming a gap, to provide access to items located between the first and second lengths, and said support has a longitudinal slot adjacent said gap to also provide access to the items.

4. The conveyor of claim 3 wherein said assembly is adapted to convey bags, with said assembly including a detection device to protrude between the first and second members to engage the bags located between the first and second lengths to apply pressure thereto and to determine a change in the volume of the bag to thereby detect bags with leaks.

5. The conveyor of claim 1 wherein said assembly is adapted to convey bags, with said assembly further including a detection device to engage said second length to apply pressure to bags located between the first and second lengths and to detect a change in volume of the bags to thereby detect bags that leak.

6. The conveyor of claim 1 wherein said assembly includes first and second belts, said first and second belts being positioned on opposite sides of said first length to engage said first length so as to maintain said first length stationary with respect to said second length.

7. A combination to detect leaks in bags, said combination including:
    a conveyor assembly that receives the bags so that the bags are located at spaced locations along the conveyor assembly, the conveyor assembly providing two conveyor lengths that are coextensive and between which the bags are located so that each bag is located in a compartment defined between the lengths, each compartment having a configuration, and a retaining assembly associated with a first one of the lengths so as to maintain the configuration of the compartments provided by the lengths;
    a pressure assembly to engage the bags within the compartments to apply pressure thereto so that bags that leak are reduced in volume;
    a detector located downstream of the pressure assembly to engage each bag in its respective compartment and to provide a signal indicative of the volume of each bag engaged; and
    a detector located upstream of said pressure assembly to engage each bag in its respective compartment and generate a signal indicative of the volume thereof so that bags that leak can be detected by comparing the signals generated by the detectors in respect of each bag.

8. The combination of claim 7 wherein the first length is provided by a first conveyor and said second length is provided by a second conveyor, with one of the conveyors including coextensive transversely spaced first and second endless members, and each detector includes a projection that projects between the endless members to engage the bags.

9. The combination of claim 8 wherein and said pressure assembly includes at least one projection that projects between the endless members to engage the bags to apply pressure thereto.

10. The combination of claim 9 wherein the first and second members provide said first conveyor, with the conveyor members being generally parallel along said first length with their transverse spacing forming a gap, to provide access to bags located between the first and second lengths, and said support has a longitudinal slot adjacent said gap to also provide access to the bags.

11. The combination of claim 10 wherein each detector protrudes between the first and second members to engage the bags located between the first and second lengths to apply pressure thereto and to determine a change in the volume of the bag to thereby detect bags with leaks.

12. The conveyor of claim 11 wherein the retaining assembly includes first and second belts, said first and second belts being positioned on opposite sides of said first length to engage said first length so as to maintain said first length stationary with respect to said second length.

13. A combination to detect leaks in bags, said combination including:
   a the conveyor assembly of claim 1 that receives the bags so that the bags are located at spaced locations along the conveyor assembly, said assembly having opposing surfaces between which the bags are located so that the bags are confined; and
   a detector device that engages each bag at a downstream location and an upstream location so as to generate signals indicative of the volume of each bag at each location; and
   a pressure device to apply pressure to the bags as they pass between the upstream and downstream occasions locations so that bags that leak will have a reduced volume by the time they reach said upstream location so that the signals generated in respect of each bag can be compared to thereby identify bags that have been reduced in volume as a result of the pressure being applied thereto.

14. A combination to detect leaks in bags, the combination including the conveyor assembly of claim 1 adapted to receive bags so that the bags are located at spaced locations along the conveyor assembly, the conveyor assembly having a downstream location and an upstream location between which the bags are conveyed, and wherein said combination further includes:
   a pressure device to apply pressure to the bags as they pass between the upstream and downstream location so that bags that leak will have a reduced volume by the time they reach the upstream location; and
   a detector device that engages each bag at the downstream location and the upstream location so as to generate signals indicative of the volume of each bag at each location to thereby enable identification of bags that have a reduced volume as a result of pressure being applied thereto.

15. The combination of claim 14 wherein said pressure applying device applies pressure to said second conveyor length to thereby apply pressure to the bags.

16. The combination of claim 14 wherein said detector device engages said second conveyor to detect a reduced volume in any one of the bags.

17. The combination of claim 16 wherein said pressure device incorporates said detector device.

18. A method of detecting bags that leak, said method including the steps of:
   locating a plurality of bags, each having a volume, on a conveyor assembly that substantially encloses the bags each in a respective compartment, each compartment having a configuration that is maintained over a length of the conveyor assembly;
   engaging each bag at a downstream location of said length with a detector device that generates a signal indicative of the volume of the bag engaged;
   applying pressure to the bags upstream of said downstream detector; and
   engaging each bag at an upstream location of said length, with said detector device to generate a signal indicative of the volume of each bag engaged so that the signals generated, as a result of engagement of the bags at the locations, in respect of each bag can be compared to identify the bags that have been reduced in volume as a result of the pressure being applied thereto.

19. The method of claim 18 wherein the conveyor assembly includes a first conveyor length and a second conveyor length between which the bags are located, with said second conveyor length being deformed to form said compartments and moving in unison with the first conveyor length.

20. The method of claim 19 wherein said second conveyor length is located above said first conveyor length.

21. The method of claim 18 wherein the detector device includes a downstream detector and an upstream detector.

22. The method of claim 21 wherein the configuration of the compartments is maintained between the detectors.

* * * * *